W. H. VOSS.
WASHING MACHINE GEARING.
APPLICATION FILED APR. 13, 1914.

1,156,116.

Patented Oct. 12, 1915.

Witnesses:

Inventor:
William H. Voss
by Wallace R. Lane
Atty

UNITED STATES PATENT OFFICE.

WILLIAM H. VOSS, OF DAVENPORT, IOWA.

WASHING-MACHINE GEARING.

1,156,116.  Specification of Letters Patent.  Patented Oct. 12, 1915.

Original application filed March 2, 1912, Serial No. 681,228. Divided and this application filed April 13, 1914. Serial No. 831,382.

*To all whom it may concern:*

Be it known that I, WILLIAM H. VOSS, a citizen of the United States, residing at Davenport, in the county of Scott and State of Iowa, have invented new and useful Improvements in Washing-Machine Gearing, of which the following is a specification.

This invention relates to driving mechanisms for washing machines and in particular to a driving mechanism adapted to drive an upright dolly, which enters the tub from underneath, such as disclosed in my co-pending application Ser. No. 681,228, filed March 2, 1912, of which this application is a division.

It is an object of this invention to provide driving connections which may be driven either by hand or power and including an arrangement which permits the interposition into the driving connections for the dolly of the wringer of driving mechanism including a wringer reverse mechanism.

Other objects and advantages of the invention will appear as the description to follow proceeds.

Figure 1:
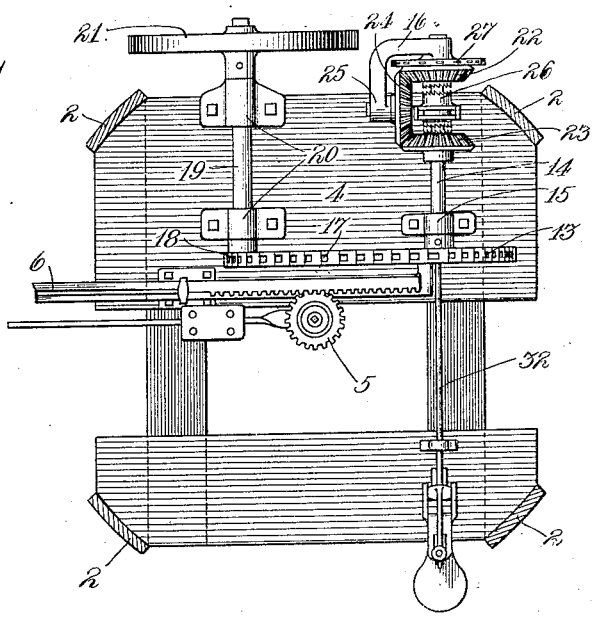
Figure 2:
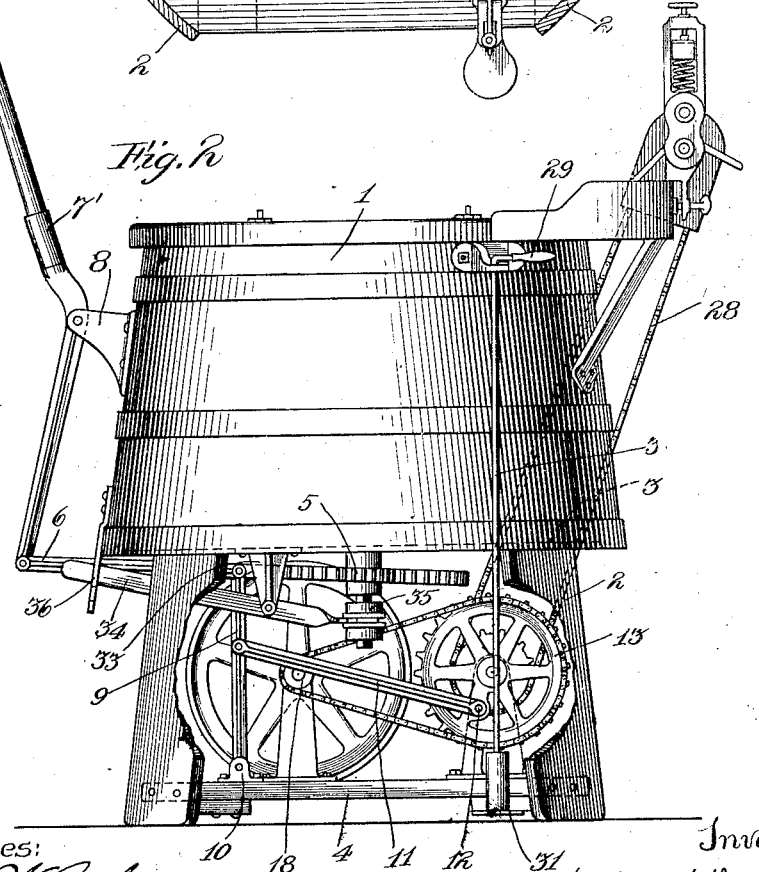

In the drawings: Figure 1 is a plan view showing the platform under the tub. Fig. 2 is an elevation.

The tub 1 is supported as usual upon legs 2 and is preferably provided with a steel bottom 3 through which projects the dolly as described and claimed in my co-pending application above referred to. A platform 4 is supported upon the legs and carries bearing standards for the various driving mechanisms now to be described. The dolly shaft is provided with a pinion 5 adapted to be oscillated by the rack bar 6 operated by means of the handle 7 pivotally mounted on the bracket 8 secured to the side of the tub. Pivotally connected to the rack bars 6 is the rocking lever 9 pivotally mounted at its lower end in the lugs 10 upon the platform 4. Thus the reciprocation of the rack bar 6 will rock lever 9 upon its pivotal point of attachment to the lugs 10. Pivotally connected to the rocking lever 9 is the pitman 11 which at its other end is pivotally connected to a crank pin 12 on the sprocket gear 13 keyed upon the shaft 14 mounted in bearing brackets 15 and 16 upon the platform 4. A sprocket chain 17 is trained over the sprocket wheel 13 and the sprocket wheel 18 fast upon the shaft 19 mounted in bearing brackets 20 upon the platform 4. The shaft 19 has pinned thereto at its opposite end, the fly-wheel 21. This fly-wheel in the normal operation of the machine is obviously rapidly rotated by means of the speed increasing gearing 13 and 18 and maintains the momentum of the machine causing a smooth operation and enabling it to be operated by a succession of more or less intermittent pushes or pulls on the handle 7. The fly-wheel 21 may obviously, however, be turned into a prime mover by attaching a belt thereto and driving the machine from this end of the gearing, as by an electric motor, gasolene engine, etc. In this event, the handle 7 would simply rock back and forth and in practice when so driven the wooden portion of the handle 7 is removed from the socket 7' so as not to wag idly in the air.

The wringer reverse mechanism is mounted on the shaft 14 in the special bearing 16 which upholds one end of that shaft. It comprises a pair of bevel gears 22 and 23, each in mesh with the bevel gear 24 mounted in a bearing 25, at right angles to the shaft 14 and integral with the bearing bracket 16. Between the bevel gears 22 and 23 is slidably mounted the clutch element 26 adapted to engage either bevel gear. The clutch element 26 is keyed to the shaft 14 and may be shifted into engagement with either bevel gear 22 or 23 by means of a fork, not shown. The bevel gear 22 is provided with a sprocket wheel 27. It is obvious that by shifting the clutch element 26 into or out of engagement with the bevel gears 22 and 23, the sprocket 27 may be driven in either direction and thus the wringer which is driven from the sprocket by means of the chain 28 be driven forward or reversed. When the clutch element is in neutral position as shown in Fig. 1, the wringer is stationary. I will not specifically describe the elements for operating this clutch mechanism, because they have been explained in a previous application. These comprise a handle 29 operating a rod 30 and a foot pedal 31, each individually capable of shifting a rod 32 in such a fashion as to shift the clutch 26 into either of its three positions at the will of the operator.

Pivotally mounted on a bracket 33 depending from the bottom of the tub is a hand lever 34 which at its forward end is forked and engages a clutch element 35 by which the pinion 5 of the dolly is engaged to its shaft. The hand lever 34 may be seated in appropriate notches in a notch plate 36 depending from the side of the tub. This lever enables the dolly to be thrown out when the power is to be used exclusively for wringing the clothes.

I claim:—

1. In combination with a support, a vertical shaft mounted in said support and adapted to oscillate a pinion on said shaft, a reciprocatory rack for oscillating said shaft, clutch mechanism operatively positioned between said rack and said shaft, a hand lever pivoted to the side of the support for operating the rack, a rocking arm pivotally mounted on one end upon the support and pivotally connected at the other end to the rack, a link connecting said rocking arm with a power momentum device, and said power momentum device.

2. In apparatus of the class described, a support, an oscillatory shaft therein, a pinion on said shaft, a hand lever, a rack pivotally connected to the hand lever for driving said shaft, a rocking arm operated by said rack, a pitman on said rocking arm, and a power momentum device operable by said pitman.

3. In apparatus of the class described, a support, an oscillatory shaft therein, a pinion on said shaft, a hand lever, a rack pivotally connected to the hand lever for driving said shaft, a rocking arm operated by said rack, a pitman on said rocking arm, a power momentum device operable by said pitman and a clutch for operatively connecting or disconnecting said rack from said shaft.

4. In apparatus of the class described, a support, a vertical reciprocatory shaft therein, a lever pivoted to the side of the support and having a rack pivotally connected therewith, a pinion loosely mounted on said shaft and a clutch for operatively connecting or disconnecting said pinion with said shaft, said rack meshing with said pinion, a rocking arm pivotally mounted on the support and pivotally connected with said rack, a power momentum device, and a link connecting said rocking arm with said power momentum device.

5. In apparatus of the class described, a support, an oscillatory shaft mounted in the lower portion of said support, and projecting upwardly therein, a power momentum device, a compound lever system for operating said power momentum device, including a simple lever system for operating said oscillatory shaft.

In witness whereof, I hereunto subscribe my name to this specification in the presence of two witnesses.

WILLIAM H. VOSS.

Witnesses:
WILLIAM E. PULS,
GEORGE W. CARDINAL.